United States Patent [19]

Fan et al.

[11] Patent Number: 5,054,872
[45] Date of Patent: Oct. 8, 1991

[54] POLYMERIC OPTICAL WAVEGUIDES AND METHODS OF FORMING THE SAME

[75] Inventors: Bunsen Fan, Peekskill, N.Y.; Donis G. Flagello, Ridgefield; Jeffrey D. Gelorme, Plainville, both of Conn.; Modest M. Oprysko, Mahopac, N.Y.; Albert Speth, Yokners, N.Y.; Jeannine M. Trewhella, Peekskill, N.Y.

[73] Assignee: IBM Corporation, Yorktown Heights, N.Y.

[21] Appl. No.: 495,241

[22] Filed: Mar. 16, 1990

[51] Int. Cl.⁵ .................................. G02B 6/10
[52] U.S. Cl. ...................... 385/130; 430/97; 385/143; 385/145
[58] Field of Search ............ 350/96.12, 96.29, 96.30, 350/96.31, 96.34, 320; 430/56, 97, 124

[56] References Cited

U.S. PATENT DOCUMENTS

| | | |
|---|---|---|
| 4,046,567 | 9/1977 | Pye ....................................... 430/280 |
| 4,311,726 | 1/1982 | Hacker et al. ................ 350/96.12 X |
| 4,593,975 | 6/1986 | Nakauchi et al. ................. 350/96.34 |
| 4,645,297 | 2/1987 | Yoshihara et al. ........... 350/96.30 X |

Primary Examiner—John D. Lee
Attorney, Agent, or Firm—Sughrue, Mion, Zinn Macpeak & Seas

[57] ABSTRACT

A structure comprising a layer of polymeric material containing epoxy groups having preselected regions of different degrees of polymerization and different refractive indices; and a method for forming a structure comprising a layer of polymeric material containing epoxy groups having preselected regions of differing degrees of polymerization and differing refractive indices which comprises providing a polymeric material containing epoxy groups on a support and selectively modifying the refractive index in said material.

34 Claims, 3 Drawing Sheets

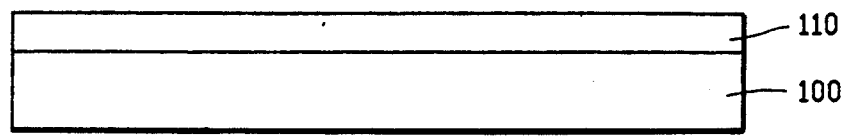
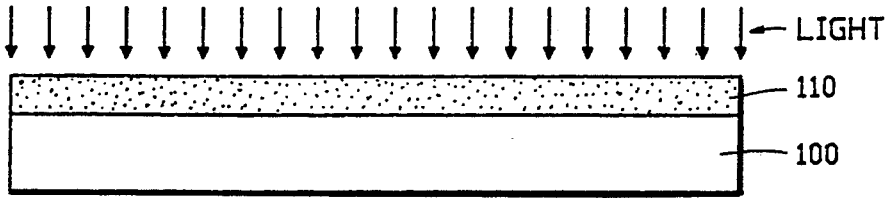
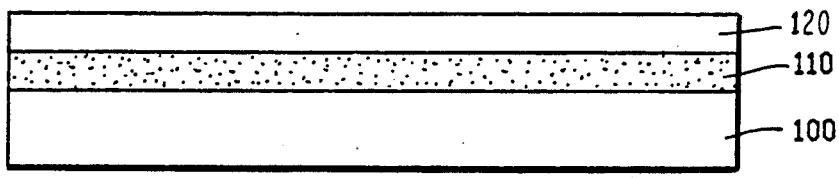
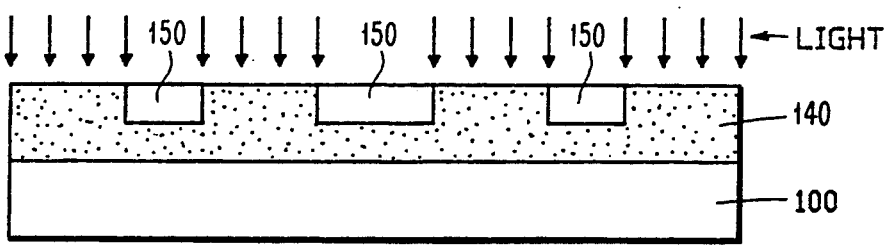
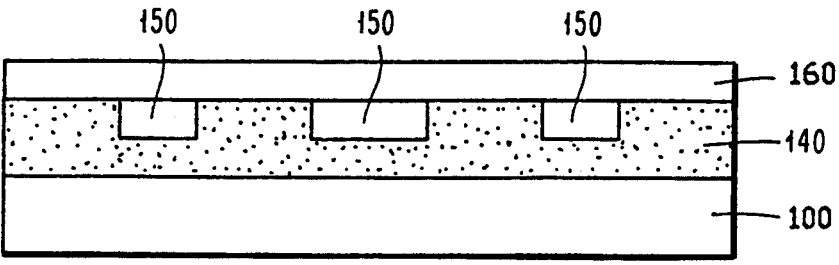
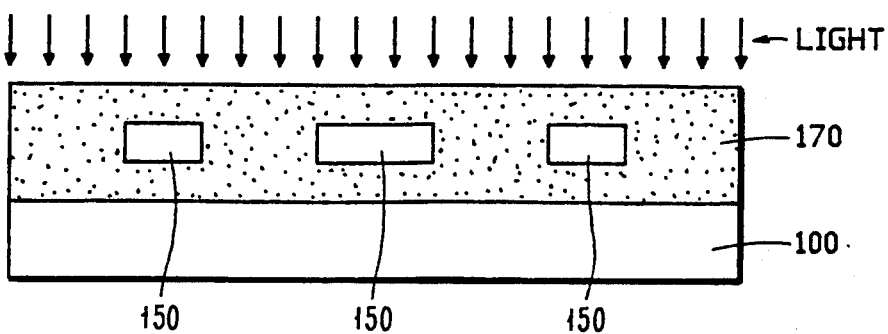

POLYMERIC OPTICAL WAVEGUIDES AND METHODS OF FORMING THE SAME

FIELD OF THE INVENTION

The present invention relates to polymeric optical waveguides and to methods for forming the same.

DESCRIPTION OF THE PRIOR ART

A basic optical waveguide is a strip structure comprised of a material of a high refractive index surrounded by a material of a lower refractive index. Both the geometry of the waveguide and the refractive indices of the components would determine the optical guiding characteristics of the waveguide. As an example, the lower refractive index material can even be air. Such a waveguide would, however, be lossy due to the likely large refractive index difference between the waveguide and the air, which would act as a cladding medium. Further, there would be no environmental protection for such a waveguide. As a consequence, a necessary addition to such a basic optical waveguide would be to clad the waveguide with a material having a lower index of refraction. Obviously, it would be desirable to have a simple process to perform such cladding. A planar process where a single film of material could be patterned and modified in some manner that could selectively control the refractive index of the cladding would be a highly desirable approach. This has been recognized in the art.

The prior art teaches an optical waveguide formed by doping a polycarbonate film with monomers, specifically methyl methacrylate, lithographically exposing the film, and finally heating the film to drive off monomer in unexposed areas. The result was a net refractive index difference between the exposed and unexposed areas of the polycarbonate film, providing a means for guiding light. This approach is disclosed in the following publications: "Optical Waveguide Intersections Without Light Leak, " T. Kurokawa et al, Appl. Opt., 16,1033 (1977); "Fiber Optic Sheet Formation By Selective Photopolymerization, " T. Kurokawa et al, Appl. Opt., 17,646 (1978); "polymer Optical Circuits For Multimode Optical Fiber Systems, " T. Kurokawa et al, Appl. Opt., 19,3124 (1980); and "Polymer Waveguide Star Coupler, " N. Takato et al, Appl. Opt., 21,1940 (1982).

Taking Applied Optics, Vol. 17, No. 4 as representative, in the polycarbonate/methyl methacrylate system disclosed, benzoinethylether is added as a photosensitizer. Upon selective exposure of the polycarbonate to UV irradiation, the methyl methacrylate "dopant" is activated by interaction of the UV light with the benzoinethylether photosensitizer. In unexposed regions, the methyl methacrylate is subsequently thermally driven off, resulting in differences in refractive indices between the exposed and unexposed areas.

More recently, a method was developed which involved the simple procedure of overcoating a patterned film with another polymer, i.e., not a polycarbonate, having a lower index of a fraction. "Low Loss Single Mode Plastic Waveguide Fabricated By Photopolymerization, " K. Miura et al, paper MC3, Integrated Guided Wave Optics Conf., Santa Fe, N.M. 1988.

A further proposal in the prior art involved forming planar waveguides by photopolymerizing acrylates. Again, these waveguides were not capable of withstanding temperatures much above 100° C. "Polyguide- Photopolymer Optical Waveguide Technology", Product literature from British Telecom and DuPont, 1988.

To date, however, there has not yet been a successful approach to the problems involved in fabricating planar optical waveguides which have the combined attributes of low propagation loss, reasonable temperature tolerance and electronic packaging process capability.

Optical waveguides can be used in the computer system packaging environment. Examples include structures which provide connections between high density optoelectronic devices on chips to comparatively larger optical fibers, redistribution structures, such as star couplers, which allow the same optical information to be distributed to several locations and optical time delay elements for fine tuning of circuit timing.

Although optical waveguides have been investigated for over twenty years, they have found few applications. This has been due, at least in part, to the fact that prototype high performance optoelectronic devices have only recently been developed and waveguide materials with good optical properties and good process compatibility have not been available.

Polymeric optical waveguides offer also semiconductor process compatibility. Early work in this area consisted of examining photoresists, polyurethanes and epoxies. These materials were either optically lossy or became lossy at relatively low temperatures. "Solution Deposited Thin Films As Passive And Active Light Guides, " R. Ulrich et al, Appl. Opt., 11,428 (1972) and "Optical Waveguide Intersections Without Light Leak, " T. Kurokawa et al, Appl. Opt., 16,1033 (1977), earlier mentioned.

Others in the prior art have also experimented with commercially available photosensitive epoxy resins. Again, the resulting waveguides suffered from poor temperature stability and became very lossy above about 100° C. "Patterned Channel Waveguides On Printed Circuit Boards For Photonic Interconnection Applications, " D. Hartman et al, Paper MC4, Integrated Guided Wave Optics Conf., Santa Fe, N.M., 1988.

U.S. Pat. No. 4,749,245 Kawatsuki et al discloses a thin film waveguide path which comprises a waveguide path layer overlying a substrate but separated from the substrate by at least one intermediate layer. The waveguide path layer comprises a first transparent high molecular weight material, the at least one intermediate layer comprises a second organic high molecular weight material having a solubility different from that of the first material and a lower refractive index than that of the first material and the substrate comprises a third high molecular weight material different from the first and second materials for supporting the waveguide path and intermediate layer(s).

In "Radiation Cured Polymer Optical Waveguides On Printed Circuit Boards For Photonic Interconnection Use, " Hartman et al, Appl. Opt., 28,40 (1989) Hartman et al disclose the fabrication and evaluation of patterned channel waveguides on printed circuit card materials for optical interconnection applications where the waveguides are fabricated from commercially available ultraviolet curing adhesives.

In "Optical Waveguide Circuits For Printed-Board Interconnections, " C. Sullivan, SPIE Vol. 994, Optoelectronic Materials, Devices, Packaging and Interconnections II, 92 (1988) integrated waveguide media based on polyimide process technology are described.

All of the above waveguide structures suffered from fabrication problems and were not functional at temperatures exceeding about 120° C. The temperature stability of such prior art is unacceptable since the temperature used to solder chips to electronic packages (i.e., substrates) exceeds 120° C.

SUMMARY OF THE INVENTION

The present invention provides photosensitive polymers and processes for photolithographically defining optical waveguides which exhibit low propagation loss, high environmental stability, have smooth walls and high aspect ratios. The processes used to fabricate such waveguides are compatible with performance electronic packages.

In one preferred embodiment, the present invention provides a polymer optical waveguide which comprises, as the active waveguide material, a fully epoxidized bisphenol A-formaldehyde novalac. In crosslinked form, this fully epoxidized novalac has a negligible optical absorption from 400 nm to 2,000 nm, i.e., is optically clear, and has a refractive index of $1.598 \pm 0.002$ at $\lambda = 0.633$ $\mu$m.

One preferred polymer optical waveguide material of the present invention comprises a layer of a polymeric material containing epoxy groups having preselected regions of different degrees of polymerization and, as a consequence, different refractive indices.

In another preferred embodiment of the present invention, after photolithographically defining the polymer optical waveguides, unexposed areas of the polymeric material containing epoxy groups are developed out to leave the polymer optical waveguides.

In accordance with the method of the present invention, an appropriate substrate is coated with the polymeric material above described and then the index of refraction is selectively modified in the polymeric material.

BRIEF DESCRIPTION OF THE DRAWINGS

FIGS. 1a-1e and 2a-2f are schematic illustrations of process sequences for fabricating polymer optical waveguides in accordance with the present invention.

DESCRIPTION OF THE PREFERRED EMBODIMENTS

Figure 1A:
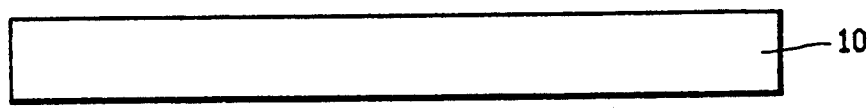

The present invention is especially directed to polymeric layers and methods for fabricating such polymeric layers which are useful as the top layers of chips and chip substrates having optical waveguides of low propagation loss and stability at temperatures in excess of 120° C.

In general, in accordance with the present invention a photosensitizer is added to a polymeric material which can be subsequently crosslinked by photoexposure to yield a photosensitive polymer. After coating the polymeric material/photosensitizer combination (hereafter often simply "the photosensitive polymer") on an appropriate substrate, by selectively exposing the photosensitive polymer combination to electromagnetic radiation the index of refraction is changed in irradiated areas as compared to non-irradiated areas, thereby forming optical waveguides.

Various aspects of the present invention are now discussed in detail.

The Substrate

The substrate used to form the optical waveguide of the present invention is in no fashion limited. Typical substrates include those suitable for supporting a polymer waveguide, for example, glass, quartz, oxidized silicon, and optically opaque (or high index) substrates such as ceramics, silicon, GaAs, etc. (i.e., any surface)

The Polymeric Material

Polymers made from ethylenically unsaturated monomers (i.e., having double bonds) such as polymethyl methacrylate (PMMA), polystyrene, polyvinyl chloride (PVC), etc., can be used to form optical waveguides. These guides tend to be of high quality and exhibit low optical loss. One fundamental limitation of these materials is that they are not thermally stable. Waveguides made of these materials become optically opaque or lossy at temperatures exceeding 120° C. Therefore, they are of little value in most optoelectronic packaging applications where temperatures in excess of 150° C. are typically used to bond chips to substrates.

The present invention involves, in one embodiment, a chemical modification to this general class of polymers which significantly increases their thermal stability while retaining their optical properties (i.e., transparency at working wavelengths). The chemical modification consists of adding a cycloaliphatic epoxy acrylate group or groups to the ethylenically unsaturated polymer(s).

In another embodiment, the present invention involves the use of a fully epoxidized Bisphenol A-formaldehyde novalac resin. We contemplate those with an average of from 6 to 8 epoxy groups per molecule to be most useful. It will be obvious to those skilled in the art that any number of epoxy groups greater than 2 groups per molecule can be used. However, 6 to 8 is the preferred number.

The polymers made from an ethylenically unsaturated monomer modified with a cycloaliphatic epoxy acrylate group are crosslinkable by photoacid generating compounds as later exemplified.

We contemplate that the polymers useful in the present invention to form the optical waveguides typically have a molecular weight of from about 5,000 to about 100,000 (number average), more preferably from about 7,000 to about 15,000.

We contemplate that the molar ratio of the polymers made from an ethylenically unsaturated monomer to the cycloaliphatic epoxy acrylate group will generally be from about 95:5 to about 0:100, more preferably 10:90 to 25:75.

Such polymers can broadly be characterized as random copolymers of various ethylenically unsaturated monomers. These polymers are commercially available in tremendous variety but probably the most well known are the ELVACITE brand of (meth)acrylate polymers from Dupont. These polymers are well known to be copolymers of methyl methacrylate and methacrylate with a range of other isomers too numerous to mention. References that teach the chemistry involved with (meth)acrylates are: Saunders, K. J., "Organic Polymer Chemistry" Chap. 6. Chapman & Hall Ltd., London, 1973; and Lenz, R., "Organic Chemistry of Synthetic High Polymers" John Wiley &

Sons, Inc. 1967, Chaps. 9-12, both incorporated by reference.

The term cycloaliphatic epoxy acrylate group includes groups such as cyclohexene monoxides, dicyclopentadiene monoxide, cyclopentene monoxide, or norbornene oxide, etc.

For example, monooxidized dicyclopentadiene (or cyclohexane) acrylic or methacrylic ester can be reacted with PMMA. This copolymer had a low optical loss but at a much higher temperature stability, i.e., 225° C. as compared to 120° C. for PMMA.

We contemplate that the following combinations will be useful as polymeric materials useful to form the optical waveguides of the present invention.

acrylates:

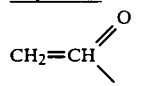

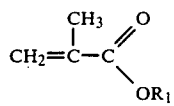

methacrylates:

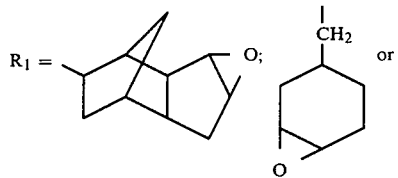

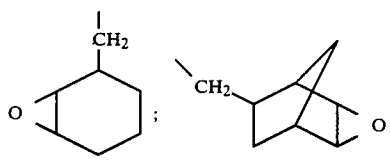

others:

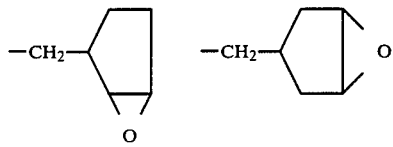

These could be copolymerized with ethylenically unsaturated monomers, e.g.:

where $R_2$=styrene, unsubstituted or optionally substituted with any conventional single substituent such as —OH; $NH_2$; COOH; Br; F; —CL, etc; vinyl halides such as vinyl chloride, or vinyl bromide, though the halide is not limited;

vinyl acetate, or other vinyl compounds such as vinyl chloride; —OH, methanol or other alcohols or other acrylates or methacrylates, e.g., of the formula:

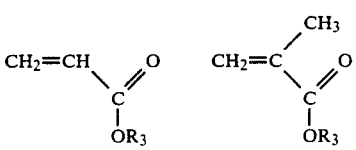

where $R_3$ could be, e.g., an aromatic group, preferably with 6 carbon atoms, i.e.,

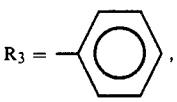

such as benzene or phenol, an aliphatic group, preferably with 2 to 6 carbon atoms, a cycloaliphatic group, preferably with 5 to 10 carbon atoms, and wherein $R_3$ could be substituted with one or more various groups such as cyclohexene monoxide, cyclopentene monoxide, norbornene monoxide, dicyclopentadiene monoxide, etc.

Crosslinking will inhibit the thermal oxidative degradation of the polymers or copolymers contemplated as useful in the present invention as compared to the non-crosslinked form thereof.

For example, methyl methacrylate can be crosslinked with dicyclopentadiene monoxide methyl methacrylate.

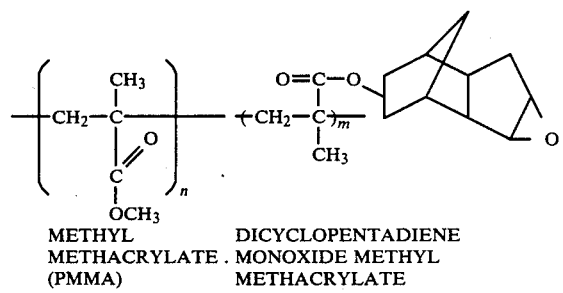

METHYL METHACRYLATE (PMMA)   DICYCLOPENTADIENE MONOXIDE METHYL METHACRYLATE

-continued
crosslinking agent

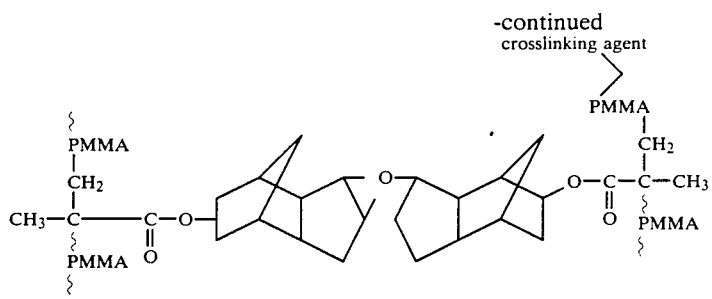

Since the polymeric material used in combination with the photosensitizer contains epoxy groups, the epoxy groups substantially increase the thermal stability of the polymeric material at temperatures in excess of 120° C., which is the extent of the thermal stability of the polymer optical waveguides of the known prior art.

In addition, a polymeric material which contains epoxy groups permits straight vertical side walls in the optical waveguide regions to be obtained through a thickness of 50 μm or more.

A most preferred polymeric material for use in the present invention is a fully epoxidized Bisphenol A-formaldehyde novalac which has an average of eight epoxy groups per molecule. It is commercially available as Epirez SU8 from Hi-Tech Polymers, Louisville, Ky.

This polymeric material can be represented by the formula:

e.g., with a polymer optical waveguide per the invention and air as a cladding Δn would be on the order of 0.6.

The Photosensitizer

The polymeric materials of the present invention, which are epoxy group containing polymeric materials, can be made photosensitive by adding photoacid generating compounds thereto, for example, aryldiazonium salts, diaryliodonium salts, triarylsulfonium salts, etc. These materials are commonly called "onium" salts. A preferred material is UVE 1014 from General Electric, Schenectady, N.Y., which comprises mixed isomers of triaryl sulfonium hexafluoro antiminoate. Useful materials are disclosed in "Photoinitiated Cationic Polymerization," J. V. Crivello, in UV Curing: Science and Technology (2nd printing), S. P. Pappas, Editor, Technology Marketing Corporation, Norwalk, Conn. 1980, incorporated by reference.

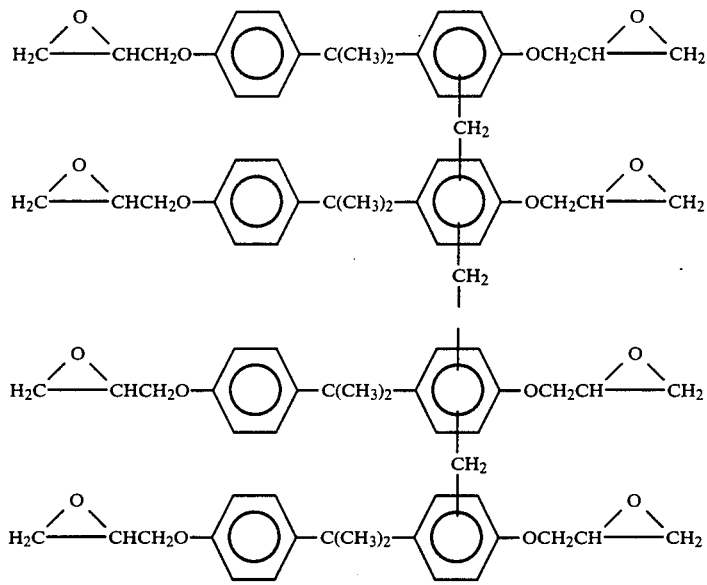

The refractive index of unexposed Epirez SU8 has been measured to be 1.603±0.002 at λ=0.633 μm. Exposed and polymerized (crosslinked) Epirez SU8 has a lower index of refraction than unexposed Epirez SU8. This difference in index of refraction, n, can be thermally fixed in the sense that after thermal fixing further exposure to irradiation does not change Δn. The value of Δn is influenced by the fixing temperature. Fixing temperatures are later discussed.

Δn has been measured to be 0.005 at λ=0.633 μm when a fixing temperature of 150° C. is used for an embedded Epirez SU8 polymer waveguide as shown in FIG. 2f). Where different claddings are used, the Δn between the core and cladding can vary substantially, The triarylsulfonium salts can be represented by the formula:

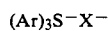

where (Ar) is aryl such as phenyl or diphenyl sulphide:

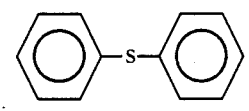

and X⁻ is an anion such as $BF^-_4$, $AsF^-_6$, $PF^-_6$, $SbF^-_6$, etc.

The Ratio of Polymeric Material to Photosensitizer

The amount of photosensitizer to polymeric material is not overly important so long as upon imagewise exposure and heating sufficient crosslinking will result to provide the desired refractive index or the desired difference in refractive indices between exposed and unexposed areas of the polymeric material (Δn), depending on the embodiment involved. The best amount can be empirically determined by a few experimental runs. We expect an amount of photosensitizer of from about 2 to about 10 wt % based on polymeric material (as solids) to generally be effective, with 5 wt % being especially preferred.

The Interaction Between the Photopolymerizable Material and the Photoinitiator The photopolymerizable material, preferably an epoxy resin, in combination with the photoacid generating compound or compounds becomes photosensitive with the result that electromagnetic radiation will induce chemical reactions which result in the crosslinking or chemical linking of one epoxy group to another. The radiation is preferably UV radiation, but other types of irradiation can be used such as, for example, lasers, X-rays, E-beams, etc. Currently we prefer to use mid-UV irradiation which is generally accepted in the art as having a wavelength of about 300 to about 400 Å, strongest intensities at 313, 337, 365 Å.

The irradiation, preferably UV irradiation, generates an acid from the photoacid (onium salt).

Upon heating the polymeric material, those regions with the acid therein polymerize differently than those regions without the acid, and the differently polymerized regions have different indices of refraction, i.e., the exposed and thus polymerized polymeric material has a lower index of refraction than the polymeric material which has not been exposed.

The Degree of Crosslinking

Crosslinking is conducted to achieve the desired refractive index or desired n between exposed and unexposed areas and one skilled in the art can readily determine the necessary conditions for any particular apparatus in combination with any particular polymer waveguide undergoing manufacture.

For example, about 650 mJ/cm² (6.5 mW/cm² for 100 seconds) for a 50 μm thick polymeric material layer with a thermal fixing at 150° C. gives a Δn of 0.005 between exposed and unexposed areas. Thus, for Δn=0.005 at λ=0.633 μm, full crosslinking was achieved in the exposed areas after thermal treatment.

Exposed areas are generally completely crosslinked after thermal treatment whereas unexposed areas are only partially crosslinked. The degree of partial crosslinking is not important so long as the desired Δn between exposed and unexposed areas is achieved in an embodiment as illustrated in FIGS. 2a) to 2f) where the polymer waveguides are the unexposed areas and the exposed areas serve as the cladding.

Figure 3A:
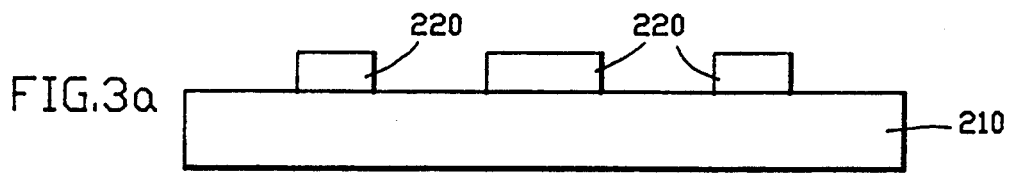
FIGS. 3a-3e present cross-sectional views of various polymer waveguides in accordance with the present invention.

In an embodiment as shown in, e.g., FIG. 3a) where the unexposed areas represent the polymer cladding and a separate cladding layer is used, again it is the Δn which is important after exposure.

Thermal Fixing

As later discussed, the polymeric material of the present invention is thermally fixed following exposure to electromagnetic irradiation, be it an imagewise or flood exposure.

Thermal fixing is typically at a temperature above about 120° C. In general, we would not often contemplate thermal fixing at a temperature much above about 150° C.

Typically, however, we thermal fix at about 150° C., essentially to decompose the photoinitiator. As a consequence, subsequent exposure will not change the index of refraction. Heating at much above 150° C. slowly drives the polymerization or crosslinking reaction, thereby diminishing the index of refraction difference between exposed and unexposed areas in one embodiment of the invention.

For example, at 150° C. Δn=0.005 and at 200° C. Δn becomes negligible. As temperature goes above 150° C., the refractive index difference becomes smaller.

The Solvent

The polymeric material and photosensitizer will generally be applied in layer form in a solvent which is subsequently driven off. The solvent is not important as long as it permits a homogeneous solution of the polymeric material and photosensitizer to be obtained, can be driven off at a reasonably low temperature, e.g., on the lines of about 60 to about 110° C. and has no harmful influence on the polymeric material, photosensitizer or substrate. Useful solvents should include methyl ethyl ketone, methyl isopropyl ketone. γ-butyrolacetone, tetrahydrofuran. glycol methyl ether acetate (diglyme). etc.

Optional Additives

To assist in spin coating or the like. a conventional surfactant can be added as a coating aid. e.g. FC430 from 3M.

The Process

General Embodiment

Figure 1B:
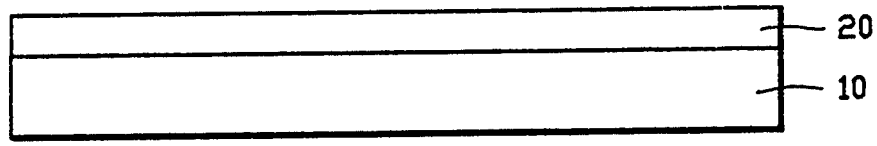

In one embodiment, which is illustrated in FIGS. 1a) to 1e), the process sequence for fabricating the polymer optical waveguide in accordance with the present invention comprises firstly coating a suitable substrate 10 as shown in FIG. 1(a) with a layer 20 of a cladding material such as quartz. glass. a polymer. etc. as shown in FIG. 1b). The cladding layer has a lower index of refraction than the core or polymer waveguide material of the present invention and is optically clear. Any conventional cladding can be used as well as another of the photosensitive polymers disclosed herein which meet these criteria and in certain embodiments later shown in FIG. 3 the cladding material is the exposed polymeric material of the present invention and the core or polymer waveguide is the unexposed polymeric material of the present invention. Similar remarks apply to FIG. 2f). We contemplate cladding layers having a thickness on the order of about 1 μm to about 50 μm will prove to be of most general application. but this thickness range is not limitative. If desired, a polymer cladding layer can be formed using techniques, solvents and baking conditions as later exemplified for the photosensitive polymer.

As one skilled in the art will appreciate, the Δn between the cladding and a core can vary greatly and is not restricted. For example with a structure as shown in FIG. 3e). the Δn would be 0.005 and for an air cladding as shown in FIG. 3a). Δn could be on the order of 0.6. As a general rule, the lower the Δn, the better.

For optically transparent substrates of low refractive index, the additional cladding layer is optional. However, it is required for some applications, as an "optically opaque" substrate such as a ceramic (used for IC chip carriers). a glass epoxy (used for printed circuit boards). or metal, can be used as well as dielectric substrates with a higher index of refraction. Such a substrate layer or cladding layer which is polymeric may also be used to planarize the substrate.

Figure 1C:
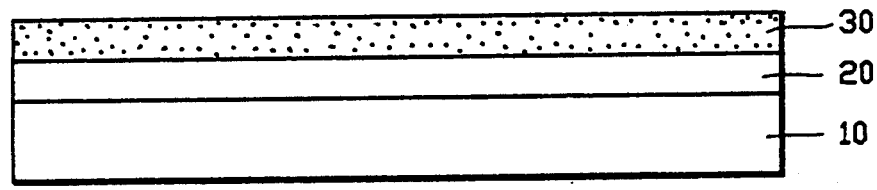

As shown in FIG. 1c), next a layer 30 of the photosensitive polymer, typically Epirez SU8 with a photoacid is applied. Coating can be by spinning. doctor blading, or any other suitable conventional technique. The applied coating on the substrate is then subjected to a first baking at 90° C. for several minutes. Typically this baking will be at about 60° to about 110° C. for from about 5 minutes to about 240 minutes. The purpose of this baking is to drive off solvent(s). Usually baking is in air at normal ambient pressure, but we see no reason why other ambients such as nitrogen, vacuum, argon, etc., or sub- or even super-atmospheric pressure could not be used, though we currently see no benefits to such modifications.

The film thickness obtained will, of course, depend upon the desired application. Typically it can be from less than 1 micron to several hundred microns, and we expect from about 1 micron to about 125 microns will suffice for most commercial uses in optoelectronic packaging.

Figure 1D:
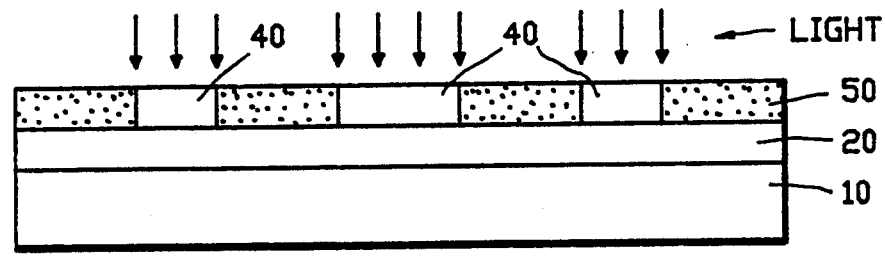

The next step in the process will typically be to lithographically expose the film which has been formed to generate the photoacid which will cause the crosslinking reaction and thereby pattern the wave guides as shown in FIG. 1(d). Exposure can be through a conventional lithographic mask and is typically performed using standard mid-UV irradiation through a negative photomask which will yield the desired pattern of exposed areas 40 and unexposed areas 50 as shown in FIG. 1d) (exposure light is shown by the arrows). Alternatively, lithographic patterning could be performed using other suitable sources of energy such as lasers, X-rays, E-beams, etc.

The degree of exposure is not overly important so long as crosslinking can be completed in the exposed areas, but will typically be on the order of from about 200 to about 1000 mJ/cm², preferably 650 mJ/cm². As an alternative, a combination of two different types of radiation as above discussed could be used for the imagewise exposure, for example a combination of conventional lithography and lasers.

Following the lithographic exposure, the film is then thermally fixed at about 90° C. for about 10 minutes in air or under a nitrogen ambient. It is contemplated that this second heating step which will develop the waveguides will be at a temperature from about 70° C. to about 110° C. for about five minutes to about thirty minutes. Other atmospheres than air or nitrogen can be used, for example, vacuum, argon, etc,. Usually this bake is a normal atmospheric pressure, but we currently see no reason why sub- or super-atmospheric pressures would not be prohibited.

Figure 1E:
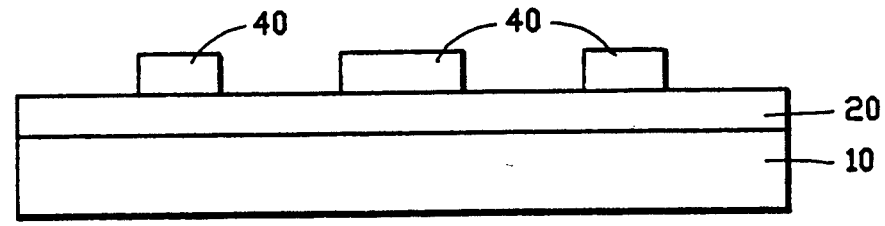

Following the above heating, the film is allowed to cool in a conventional manner and in this embodiment is then developed using a developer such as propylene glycol methyl ether acetate or other conventional developers, such as the solvents earlier given, to result in a product as shown in FIG. 1e). Development will result in removal of the unexposed areas 50, permitting the exposed areas 40 to remain which will function as the polymer waveguides of the present invention.

Conventional conditions are used, for example, development can generally easily be effected at room temperature for a period of from about several seconds to about several minutes in air, depending on the development technique (spray or simple immersion), and can easily be selected by one skilled in the art.

The final step will generally be a rinsing or cleaning with a material such as isopropyl alcohol, ethyl alcohol, etc.

The polymer waveguides thus formed result from a very simple process as compared to the prior art, a major benefit of the present invention, and comprise very smooth, vertical structures which exhibit excellent characteristics as polymer waveguides.

Embedded Polymer Waveguide Embodiment

In an alternative process sequence for forming polymer waveguides in accordance with the present invention, embedded channel polymer waveguides can be formed. This process is schematically illustrated in FIG. 2 with variations being shown in FIGS. 3c), 3d) and 3e).

The following explanation is offered with reference to FIGS. 2a) to 2f).

In FIG. 2a) substrate 100 is coated by spin coating or the like with a layer or film of the photosensitive polymer as shown by layer 110. Following coating, the overall assembly is baked at about 90° C. for several minutes, e.g., 15 minutes in an ambient such as air, nitrogen, argon, vacuum, etc. The conditions are generally the same as earlier described for the first bake for lithographically defining a polymer optical waveguide under General Embodiment.

Following the above baking, as shown in FIG. 2b) the assembly is subjected to flood exposure of the entire film 110 using mid-UV irradiation as shown by the arrows (unlabelled). Conditions as are used for imagewise exposure for the General Embodiment are acceptable. The product of FIG. 2b) is then subjected to a thermal fixing by heating at about 120° C. for several minutes, typically at about 70° C. to about 110° C. for from about 5minutes to about 30 minutes under an ambient such as used for the baking step illustrated in FIG. 2a) at normal pressure.

Following the above processing, as shown in FIG. 2c) a second layer of the photosensitive polymer is coated on layer 110, this second polymer material with photosensitizer being shown as layer 120 in FIG. 2c).

Typically the thickness of the first layer 110 as shown in FIG. 2c) will be from about to about 50 μm and the thickness of the second layer 120 as shown in FIG. 2c) will be from about 1 to about 50 μm, though end use application will determine the exact thickness.

Following the procedure of FIG. 2c), lithographic (or imagewise) exposure with, e.g., mid-UV light is then conducted as shown in FIG. 2d) to pattern the waveguides. The imagewise exposure with mid-UV irradiation as shown by the arrows (unlabelled) in FIG. 2d) results in a polymerization, upon heating, of those areas of layer 120 which are exposed, whereby the combination of layer 110 and layer 120 is converted into crosslinked polymeric material areas represented by 140 in FIG. 2d) and unexposed (and thus non-crosslinked) areas represented by 150 in FIG. 2d). Conditions as are used in the General Embodiment are generally acceptable.

The product as shown in FIG. 2d) is also subjected to a thermal fixing as earlier described at the same conditions.

Following the procedure of FIG. 2d), if desired or necessary, a superstrate layer 160 is then formed by again coating another layer of the photosensitive polymer on layer 150 as shown in FIG. 2e). Typically the superstrate layer 160 will have a thickness on the order of from about 1 to about 50 μm.

As shown in FIG. 2f), a flood exposure with mid-UV irradiation as shown by the arrows (unlabelled) is again conducted, whereby layer 160 is crosslinked, yielding, as shown in FIG. 2f), the embedding exposed photosensitive polymer 170 encasing and protecting waveguide elements 150 and serving as a cladding.

Control of the flood exposure so that the unexposed areas 140 are also not exposed is no problem after thermal fixing.

Following the above flood exposure, thermal fixing is conducted using the conditions as earlier defined.

By repeating the procedure of FIGS. 2c)-2f) as above described, multi-layered waveguides can be fabricated.

FIGS. 3a) to 3e) present variations on the General Embodiment and the Embedded Waveguide Embodiment.

In FIG. 3a) polymer waveguides 220 are shown formed on a first cladding layer 210. The polymer waveguides 220 may be formed using the procedure of the General Embodiment. The cladding layer 210 may be formed of any conventional material such as glass, quartz, a polymer, etc., so long as the desired Δn between the polymer waveguides and the cladding layer is achieved. In FIG. 3a), cladding 210 also serves as the substrate. It can essentially be any material which has a lower refractive index than the polymer waveguides 220 and which exhibits the desired degree of optical clarity.

Figure 3B:
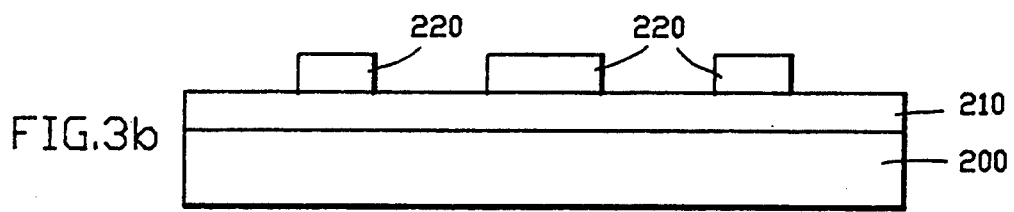

In FIG. 3b), a first cladding layer 210 carrying the polymer waveguides 220 is supported on a substrate 200. Any conventional substrate can be used.

Figure 3C:
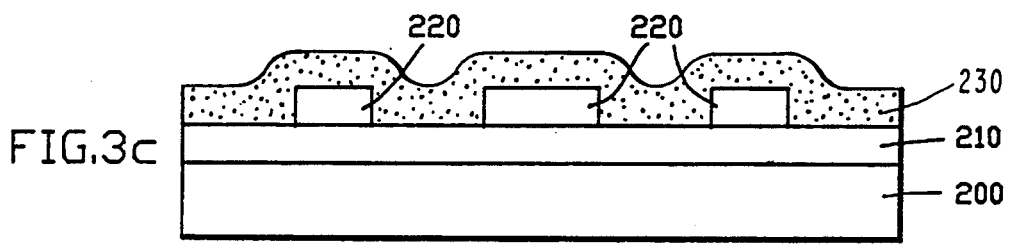

In FIG. 3c), a second polymer cladding layer 230 is formed on the polymer waveguides 220 and exposed areas of the first polymer cladding layer 210. The second polymer cladding layer 230 is typically coated in solution form and then spin coated in a conventional manner and then baked at conditions as are used for the photosensitive polymer layer earlier given to result in an overcoated waveguide structure as shown in FIG. 3c) where all numerals are as earlier identified. Second polymer cladding layer 230 may or may not result from the same starting photosensitive polymer as used to form the polymer waveguides 220. It also need not be a photosensitive polymer per this invention.

Figure 3D:
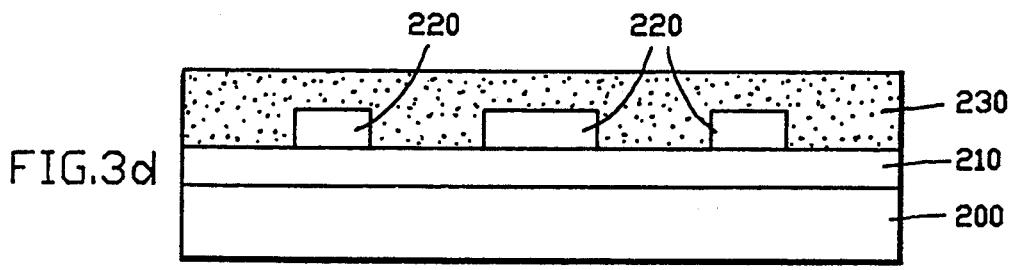
Figure 3E:
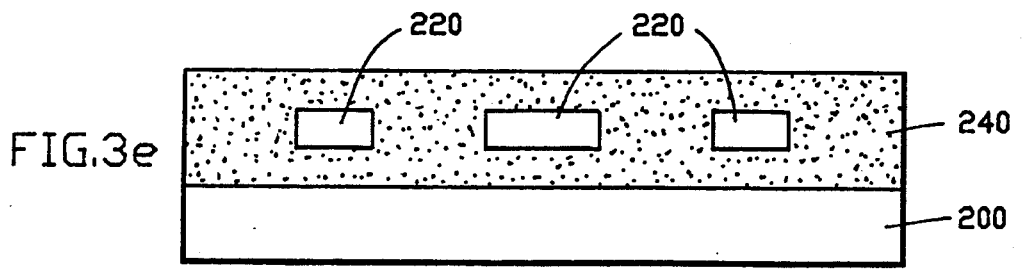

FIG. 3d) illustrates an embedded waveguide similar to that of FIG. 2f) but in FIG. 3d) areas of unexposed photosensitive polymer 220 which serve as waveguides are embedded in exposed photosensitive polymer 230 and are supported on a lower or first cladding layer of a cladding material different from the photosensitive polymer used to form the waveguides 220 and the embedding material 230. The embedding material may or may not be a photosensitive polymer in accordance with the invention and can result from a different starting photosensitive polymer, as per FIG. 3c).

The first cladding layer need not be a polymer cladding layer but can be formed of any material which will adhere to the substrate and to which the photosensitive polymer will adhere, e.g., quartz, glass, a polymer, etc. The second cladding layer will generally be formed of a polymer due to ease of application and planarization.

As an example, the polymer waveguides could be Epirez SU8 as earlier exemplified and the first and second cladding layers could be epoxy functionalized PMMA as earlier discussed; the epoxy functionalized PMMA shows the desired thermal stability because of the epoxy groups, has an index of refraction lower than Epirez SU8 and retains the good optical transparency of the PMMA.

FIG. 3e) illustrates the concept of polymer cladding where the first polymer cladding layer 210 as shown in FIG. 3d) is essentially the same as the second polymer cladding layer 230 as shown in FIG. 3d), resulting in an essentially homogeneous polymer cladding layer 240 which is similar in function to the "protective" layer 170 of FIG. 2f). Other numerals have the same meaning as in FIG. 3d).

As will be apparent to one skilled in the art, the support can be optically opaque or can have index of refraction higher than that of the waveguide elements.

The process of the present invention has been successfully practiced to form waveguides 6 μm wide separated from each other by 12 μm. Assuming three waveguides each of which are parallel and rectangular as viewed from above (separation; 12 μm between waveguides), light at 1.3 μm was injected into the center waveguide. It was found to exit the waveguide. The lack of light exiting from the adjacent waveguides established that the waveguides were of high quality in terms of exhibiting low crosstalk and good confinement of optical information. We believe we can easily achieve polymer waveguide widths down to about 2 μm, though this is primarily determined by the photolithographic tooling available, not the photosensitive polymer. As one skilled in the art will appreciate, larger widths are much simpler to obtain.

Testing has established that the waveguides of the present invention:

exhibit low propagation loss;

are lithographically patternable with very high resolution and a very high aspect ratio;

are optically clear over a wavelength range of 400 to 2,000 nm;

have optically induced index changes which remain stable;

have an index difference between exposed and unexposed areas which becomes negligible at temperatures above 200° C.;

have sidewalls which are very smooth, a characteristic necessary for low propagation loss for waveguides;

exhibit a low loss ($<0.3$ dB/cm at $\lambda = 1.3$ μm); this figure compares favorably with that of state-of-the-art Ti:LiO$_3$ waveguides ($\leq 0.1$ dB/cm);

are optically clear at $\lambda = 1.3$ μm up to 235° C.; and have an optical degradation temperature which can be extended to ~270° C. by processing in the absence of oxygen.

Several major benefits obtained in accordance with the present invention are as follows:

Polymer optical waveguides can be directly formed in a polymeric material, most preferably a photosensitive epoxy resin, by lithographic exposure techniques which provide a net difference in the index of refraction between exposed areas and unexposed areas;

The index of refraction difference can be thermally stabilized and the process can be repeated to form totally encased or buried waveguides using a single polymeric material;

The process can be used to form waveguide structures on any carrier including glass, ceramics, silicon, etc.; and Control of the index of refraction difference by varying the fixing temperature and controlling the polymer waveguide size by varying the lithography conditions can be used to form multi- or single-moded polymer waveguide structures.

Having thus generally described the invention, the following non-limiting examples which illustrate the currently preferred best mode of practicing the invention are offered.

EXAMPLE 1

This Example shows the formation of a polymer waveguide as illustrated in FIG. 1 using the earlier explained General Embodiment.

A conventional silicon substrate having a 4 $\mu$m thick $SiO_2$ layer thereon was doctor blade coated (the $SiO_2$ was to be coated) with a 50 $\mu$m thick film of Epirez SU8 in diglyme (78% wt % epoxy, as solids, based on solution weight) containing 5 wt % UVE 1014 (based on epoxy weight) as a photoinitiator.

The assembly was then baked at 90° C. for thirty minutes in an air at ambient pressure and then exposed through a conventional negative photomask using mid-UV at 365 nm at an energy fluency of 650 mJ/cm$^2$.

The resulting exposed areas were 50 $\mu$m wide, 50 $\mu$m thick and the center-to-center spacing of the exposed areas was 250 $\mu$m.

The assembly at this stage was thermally fixed at 90° C. for 15 minutes in air to completely crosslink the exposed areas.

Following thermal fixing of the exposed areas the unexposed areas were developed out (removed) by immersion in propylene glycol methyl ether acetate. Various contact times from 2 to 5 minutes were successfully used depending on the degree of agitation (higher agitation led to lower development times). thereby forming a polymer waveguide as shown in FIG. 1.

EXAMPLE II

This Example shows the formation of a polymer waveguide as illustrated in FIG. 2 using the earlier explained Embedded Polymer Waveguide Embodiment.

The substrate was again silicon with a 4 $\mu$m thick layer of $SiO_2$ thereon (the $SiO_2$ was to be coated or thermally grown).

The polymer material was the same as in Example 1 except it was diluted 1:1 by weight with diglyme in this Example. The photoinitiator was again UVE 1014 (5 wt % based on epoxy weight). It was coated to a thickness of 5 $\mu$m by spin coating at 3,000 RPM.

The assembly was then baked at 90° C. for 15 minutes in air at normal pressure to drive off the solvent.

Flood exposure with mid-UV at 365 nm was then conducted at an energy fluency of 650 mJ/cm$^2$, followed by thermal fixing at 150° C. for 10 minutes under a nitrogen purge.

The same polymer material as earlier used was then spin coated at the same condition earlier used to yield a 6 $\mu$m thick film and image-wise exposed through a negative photomask to yield exposed areas 6 $\mu$m wide and 5 $\mu$m thick with a center-to-center separation between exposed areas of 12 $\mu$m. Exposure conditions were the same as for the flood exposure. Thermal fixing was then conducted at the conditions earlier used.

A superstrate layer was then spin coated using the polymer material earlier used at the conditions earlier given to yield a 6 $\mu$m thick superstrate layer. Flood exposure was then conducted at the same conditions earlier given followed by thermal fixing at the same conditions earlier given to yield the desired embedded polymer waveguide where the $\Delta n$ between exposed and unexposed areas was 0.005.

What is claimed is:

1. A planar thin film optical waveguide which comprises a layer of polymeric material containing epoxy groups wherein the polymeric material itself has preselected regions of different refractive indices, which regions of different refractive indices have been photoinduced.

2. The structure of claim 1, wherein said polymeric material containing epoxy groups is a fully epoxidized Bisphenol A-formaldehyde novalac having an average of 6 to 8 epoxy groups per molecule.

3. The planar thin film optical waveguide of claim 1, wherein said preselected regions also have differing degrees of polymerization.

4. The planar thin film optical waveguide of claim 1, wherein said layer of polymeric material consists essentially of the polymeric material.

5. A structure comprising a polymeric body containing epoxy groups having preselected regions of different degrees of polymerization and different refractive indices.

6. The structure of claim 5, wherein said polymeric material contaiing epoxy groups is a fully epoxidized Bisphenol A-formaldehyde novalac having an average of 6 to 8 epoxy groups per molecule.

7. A planar thin film optical waveguide which comprises a discrete zone of an unexposed and thermally crosslinked polymeric material containing epoxy groups, which unexposed and thermally crosslinked polymeric material has itself a first index of refraction and is embedded in an exposed and thermally crosslinked matrix of the same polymeric material containing epoxy groups which exposed and thermally crosslinked polymeric material has itself a second index of refraction which differs from said first index of refraction, said first and second index of refraction having been photoinduced.

8. The structure of claim 7, wherein said polymeric material containing epoxy groups is a fully epoxidized Bisphenol A-formaldehyde novalac having an average of 6 to 8 epoxy groups per molecule.

9. The planar thin film optical waveguide of claim 7, wherein said unexposed and thermally crosslinked material and said exposed and thermally crosslinked matrix also have differing degrees of polymerization.

10. The planar thin film optical waveguide of claim 7, wherein said discrete zone and said matrix of said polymeric material consist essentially of said polymeric material.

11. A planar thin film optical polymeric waveguide structure comprising a support carrying thereon discrete regions of exposed and thermally crosslinked polymeric waveguides which containg epoxy groups which exhibit a predetermined index of refraction.

12. The structure of claim 11, wherein said polymeric waveguides containing epoxy groups is a fully epoxidized Bisphenol A-formaldehyde novalac having an average of 6 to 8 epoxy groups per molecule.

13. The planar thin film optical waveguide of claim 7, wherein said polymeric waveguide consists essentially of polymeric material.

14. A planar thin film optical polymeric waveguide structure comprising a discrete zone of an unexposed and thermally crosslinked polymeric material containing epoxy groups, which unexposed and thermally crosslinked polymeric material has itself a first index of refraction and is embedded in an exposed and thermally crosslinked matrix of the same polymeric material containing epoxy groups, which exposed and thermally crosslinked matrix itself has a second index of refraction which differs from said first index of refraction, said first and second index of refraction having been photoinduced.

15. The structure of claim 14, wherein said polymeric material containing epoxy groups is a fully epoxidized Bisphenol A-formaldehyde novalac having an average of 6 to 8 epoxy groups per molecule.

16. The planar thin film optical waveguide of claim 14, wherein said unexposed and thermally crosslinked material and said exposed and thermally crosslinked matrix also have differing degrees of polymerization.

17. The planar thin film optical waveguide of claim 14, wherein said discrete zone and said matrix of said polymeric material consist essentially of said polymeric material.

18. A method for forming a planar thin film optical waveguide structure comprising a layer of polymeric material containing epoxy groups which layer has preselected regions of differeing refractive indices attributable to differing refractive indices of the polymeric material itself which comprises providing a polymeric material containing epoxy groups on a support and selectively modifying the refractive index of said polymeric material itself by photoinduction.

19. The method of claim 18, wherein said preselected regions also differ in degrees of polymerization.

20. The method of claim 18, wherein the selective modifying of the refractive index is by imagewise exposure and thermal crosslinking of exposed areas of the polymeric material.

21. The method of claim 18, wherein said polymeric material is a fully epoxidized Bisphenol A-formaldehyde novalac having an average of 6 to 8 epoxy groups per molecule.

22. The method of claim 11, wherein said preselected regions of differing refractive indices also differ in degree of polymerization.

23. The method of claim 18, wherein said layer of polymeric material consists essentially of polymeric material.

24. A method for forming a planar thin film optical waveguide structure which comprises applying a layer of a polymeric material containing epoxy groups to a substrate, imagewise exposing the resulting layer of polymeric material, crosslinking the exposed areas of the polymeric material and removing the unexposed areas of the polymeric material, the remaining imagewise exposed areas being optical waveguides which exhibit an index of refraction which is attributable to the polymeric material itself and which has been photoinduced by said imagewise exposing.

25. The method of claim 24, wherein said polymeric material is a fully epoxidized Bisphenol A-formaldehyde novalac having an average of 6 to 8 epoxy groups per molecule.

26. The method of claim 24, wherein said waveguides consist essentially of said polymeric material.

27. A method of forming a planar thin film optical waveguide which comprises:
coating a substrate with a cladding layer having a first refractive index;
coating the cladding layer with a layer of a polymeric material containing epoxy groups;
baking the layer of polymeric material;
imagewise exposing the layer of polymeric material to yield exposed and unexposed areas;
thermally fixing the imagewise exposed layer of polymeric material; and
removing the unexposed areas of polymeric material, whereby said exposed areas remain as discrete planar thin film optical waveguides having a photoinduced refractive index which is higher than the first refractive index.

28. The method of claim 27, wherein said discrete planar thin film optical waveguides consist essentially of said polymeric material.

29. A method of forming a planar thin film optical waveguide which comprises:
coating an optically transparent substrate having a first refractive index with a layer of a polymeric material containing epoxy groups;
baking the layer of polymeric material;
imagewise exposing the layer of polymeric material to yield exposed and unexposed areas;
thermally fixing the imagewise exposed layer of polymeric material; and
removing the unexposed areas of polymeric material, whereby said exposed areas remain as discrete planar thin film optical waveguides having a photoinduced refractive index which is higher than the first refractive index.

30. The method of claim 29, wherein said discrete planar thin film optical waveguides consist essentially of said polymeric material.

31. A method of forming discrete planar thin film optical waveguides which comprises:
coating a substrate with a layer of a polymeric material containing epoxy groups;
baking the layer of polymeric material;
subjecting the baked layer of polymeric material to a flood exposure;
thermally fixing the layer of polymeric material;
applying a second layer of a polymeric material containing epoxy groups to the baked layer of polymeric material;
imagewise exposing the second layer of polymeric material to yield exposed and unexposed areas therein; and
thermally fixing the second layer of polymeric material to polymerize the exposed areas in the second layer of polymeric material, the unexposed areas in the second layer of the polymeric material being discrete planer optical wave guides.

32. The method of claim 31, wherein said discrete planar thin film optical waveguides consist essentially of said polymeric material.

33. A method of forming a planar thin film optical waveguide which comprises:
   coating a cladding layer having a first refractive index with a layer of a polymeric material containing epoxy groups;
   baking the layer of polymeric material;
   imagewise exposing the layer of polymeric material to yield exposed and unexposed areas;
   thermally fixing the imagewise exposed layer of polymeric material;
   removing the unexposed areas of polymeric material, whereby said exposed areas remain as discrete planar thin film optical waveguides;
   coating a polymer cladding layer on the discrete planar thin film optical waveguides; and
   baking the resulting product.

34. The method of claim 33, wherein said discrete planar thin film optical waveguides consist essentially of said polymeric material.

* * * * *